US010664876B1

(12) United States Patent
Eyal et al.

(10) Patent No.: US 10,664,876 B1
(45) Date of Patent: May 26, 2020

(54) METHOD AND APPARATUS FOR PROMOTION TEMPLATE GENERATION

(71) Applicant: Groupon, Inc., Chicago, IL (US)

(72) Inventors: Aviv Eyal, Chicago, IL (US); Deepika Misra, Chicago, IL (US); Mechie Nkengla, Chicago, IL (US); Kavita Kochar, Chicago, IL (US); Ricardo Zilleruelo, Chicago, IL (US); Francisco Larrain, Chicago, IL (US); Natalia Corominas, Chicago, IL (US); Gaston L'Huillier, Chicago, IL (US)

(73) Assignee: GROUPON, INC., Chicago, IL (US)

(*) Notice: Subject to any disclaimer, the term of this patent is extended or adjusted under 35 U.S.C. 154(b) by 0 days.

(21) Appl. No.: 13/922,750

(22) Filed: Jun. 20, 2013

(51) Int. Cl.
G06Q 30/02 (2012.01)

(52) U.S. Cl.
CPC .................. *G06Q 30/0276* (2013.01)

(58) Field of Classification Search
CPC .................................................. G06Q 30/0276
USPC ....................................................... 705/14.72
See application file for complete search history.

(56) References Cited

U.S. PATENT DOCUMENTS

| | | |
|---|---|---|
| 5,715,445 A | 2/1998 | Wolfe |
| 5,870,770 A | 2/1999 | Wolfe |
| 5,946,682 A | 8/1999 | Wolfe |
| 5,948,040 A | 9/1999 | DeLorme et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |
| 6,151,603 A | 11/2000 | Wolfe |
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |

(Continued)

FOREIGN PATENT DOCUMENTS

| | | |
|---|---|---|
| KR | 10-2008-0036829 A | 4/2008 |
| WO | 00/79456 A2 | 12/2000 |

(Continued)

OTHER PUBLICATIONS

U.S. Appl. No. 61/824,850, filed May 17, 2013; In re: Kahn et al., entitled Unified Payment and Return on Investment System.

(Continued)

*Primary Examiner* — Azam A Ansari
(74) *Attorney, Agent, or Firm* — Alston & Bird LLP

(57) ABSTRACT

Provided herein are system, methods and computer readable storage media in facilitating the generation of promotions based on promotion templates for the provider's goods, services, and/or the like in an agreement between the provider, also known as a merchant, and a promotion and marketing service that is configured to illustrate or otherwise inform consumers of the availability of one or more instruments for a promotion. In providing such functionality, the system may be configured to, for example, receive promotion data, determine promotion parameters, determine provider service categories, associate at least one promotion template with at least one service category, generate a promotion for a provider, and transmit a proposed promotion to a provider.

30 Claims, 5 Drawing Sheets

(56) References Cited

U.S. PATENT DOCUMENTS

| | | |
|---|---|---|
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,384,850 B1 | 5/2002 | McNally et al. |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van Horn et al. |
| 6,604,103 B1 | 8/2003 | Wolfe |
| 6,631,356 B1 | 10/2003 | Van Horn et al. |
| 6,754,636 B1 | 6/2004 | Walker et al. |
| 6,778,837 B2 | 8/2004 | Bade et al. |
| 6,812,851 B1 | 11/2004 | Dukach et al. |
| 6,836,476 B1 | 12/2004 | Dunn et al. |
| 6,842,719 B1 | 1/2005 | Fitzpatrick et al. |
| 6,876,983 B1 | 4/2005 | Goddard et al. |
| 6,901,374 B1 | 5/2005 | Himes |
| 6,918,039 B1 | 7/2005 | Hind et al. |
| 6,928,416 B1 | 8/2005 | Bertash |
| 6,931,130 B1 | 8/2005 | Kraft, IV et al. |
| 6,934,690 B1 | 8/2005 | Van Horn et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis, II et al. |
| 7,039,603 B2 | 5/2006 | Walker et al. |
| 7,043,526 B1 | 5/2006 | Wolfe |
| 7,072,848 B2 | 7/2006 | Boyd et al. |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van Horn et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van Horn et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van Horn et al. |
| 7,376,580 B1 | 5/2008 | Walker et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van Horn et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,668,832 B2 | 2/2010 | Yeh et al. |
| 7,672,897 B2 | 3/2010 | Chung et al. |
| 7,689,468 B2 | 3/2010 | Walker et al. |
| 7,689,469 B1 | 3/2010 | Mesaros |
| 7,693,736 B1 | 4/2010 | Chu et al. |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,103,519 B2 | 1/2012 | Kramer et al. |
| 8,108,249 B2 | 1/2012 | Schroeder et al. |
| 8,131,619 B1 | 3/2012 | Veselka |
| 8,150,735 B2 | 4/2012 | Walker et al. |
| 8,284,061 B1 | 10/2012 | Dione |
| 8,301,495 B2 | 10/2012 | Mason |
| 8,355,948 B2 | 1/2013 | Mason |
| 8,364,501 B2 | 1/2013 | Rana et al. |
| 8,407,252 B2 | 3/2013 | Bennett et al. |
| 8,650,072 B2 | 2/2014 | Mason et al. |
| 10,235,696 B1 | 3/2019 | L'Huillier et al. |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1 | 8/2002 | Szabo et al. |
| 2002/0188511 A1 | 12/2002 | Johnson et al. |
| 2003/0004802 A1 | 1/2003 | Callegari |
| 2003/0018559 A1 | 1/2003 | Chung et al. |
| 2003/0055765 A1 | 3/2003 | Bernhardt |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0075945 A1 | 4/2005 | Hodge et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |

(56) References Cited

U.S. PATENT DOCUMENTS

| | | |
|---|---|---|
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2009/0006182 A1 | 1/2009 | Gammon |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0063870 A1 | 3/2010 | Anderson et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1 | 2/2011 | Hawkins et al. |
| 2011/0054996 A1 | 3/2011 | Spector |
| 2011/0099082 A1 | 4/2011 | Walker et al. |
| 2011/0153400 A1 | 6/2011 | Averbuch |
| 2011/0173096 A1 | 7/2011 | Bui |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0313840 A1 | 12/2011 | Stolte |
| 2011/0313867 A9 | 12/2011 | Silver |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Sammon |
| 2012/0088487 A1 | 4/2012 | Khan |
| 2012/0095852 A1 | 4/2012 | Lloyd |
| 2012/0101889 A1* | 4/2012 | Kurata ............... G06Q 30/0224 705/14.25 |
| 2012/0130796 A1 | 5/2012 | Busch |
| 2012/0150603 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0303434 A1 | 11/2012 | Postrel |
| 2013/0024364 A1 | 1/2013 | Katzin |
| 2013/0085804 A1 | 4/2013 | Ferro |
| 2013/0254104 A1 | 9/2013 | Fernandez |
| 2013/0275242 A1 | 10/2013 | Ramaratnam et al. |
| 2013/0317894 A1* | 11/2013 | Zhu et al. .................. 705/14.13 |
| 2014/0046757 A1 | 2/2014 | Kahn et al. |
| 2014/0074580 A1 | 3/2014 | Khuchua-Edelman et al. |
| 2014/0095232 A1 | 4/2014 | Shiva et al. |
| 2014/0122200 A1* | 5/2014 | Granville ........... G06Q 30/0212 705/14.14 |
| 2014/0207584 A1 | 7/2014 | Wicha et al. |
| 2015/0046271 A1 | 2/2015 | Scholl et al. |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |
| WO | 2014/062229 A1 | 4/2014 |
| WO | 2014/062230 A1 | 4/2014 |

OTHER PUBLICATIONS

U.S. Provisional Patent Application filed Feb. 27, 2013, U.S. Appl. No. 61/770,174.

U.S. Provisional Application filed Mar. 30, 2012, In re: Kim entitled "Generating Deal Offers and Providing Analytics Data", U.S. Appl. No. 61/618,338.

U.S. Provisional Application filed Jun. 18, 2012, In re: Kim et al. entitled Facilitating Consumer Payments and Redemptions of Deal Offers, U.S. Appl. No. 61/661,291.

U.S. Provisional Application filed Aug. 13, 2012, In re: Shariff et al. entitled Unified payment and Return on Investment System, U.S. Appl. No. 61/682,762.

U.S. Patent Application filed Sep. 28, 2012, In re: Shiva entitled "Scheduling Appointments With Deal Offers", U.S. Appl. No. 13/631,313.

U.S. Patent Application filed Mar. 15, 2013, U.S. Appl. No. 13/832,804.

Staff, "ActBig.com muscles in on group buying power", RedHerring.com, Oct. 13, 1999.

Rueb, Emily S., "Group Buying, Better Together", The New York Times City Blog, Feb. 16, 2010, 3 pgs.

PCT Written Openion of the International Searching Authority for Application PCT/US2013/033169 dated Jun. 10, 2013.

PCT international Search Report and Written Openion of the International Searching Authority for Application PCT/US2013/062389 dated May 27, 2014.

PCT international Search Report and Written Openion of the International Searching Authority for Application PCT/US2013/033145 dated Jun. 21, 2013.

PCT international Preliminary Report on Patentability for Application PCT/US2013/062389 dated Mar. 31, 2015.

PCT international Preliminary Report on Patentability for Application PCT/US2013/033169 dated Apr. 21, 2015.

PCT international Preliminary Report on Patentability for Application PCT/US2013/033145 dated Apr. 21, 2015.

Krishnan S. Anand and Ravi Aron (OPIM Department, The Wharton School, University of Pennsylvania), Group Buying on the Web: A Comparison of Price Discovery Mechanisms, Management Science, vol. 49, No. 11, pp. 1546-1562, Nov. 2003.

Kauffman, Robert J. et al., "Bid Together, Buy Together: On the Efficacy of Group-Buying Business Models in Internet Based Selling", paper prepared for the 5th Annual University of Minnesota Electronic Commerce conference, Mar. 27-28, 2001, Carlson School of Management, University of Minnesota, MN, 44 pgs.

(56) References Cited

OTHER PUBLICATIONS

International Search Report and Written Opinion for Application No. PCT/US201.2/027616 dated Sep. 27, 2012.
Editor, "Technology Drives ActBig 'Next Generation' GroupBuying Application", Market Wire, Feb. 29, 2005.
Bermant, Charles, "ActBig: Save BiG", Internetnews.com, Nov. 16, 1999, 3 pgs.
Alan S. Davis "Group Buying on the Internet", Seminar Presentation Slides, University of Minnesota, MIS Research Denter, Mar. 10, 2006.
"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

* cited by examiner

METHOD AND APPARATUS FOR PROMOTION TEMPLATE GENERATION

TECHNICAL FIELD

The present description relates to determining and/or generating promotions based on promotion templates by a provider of goods, services, experiences and/or the like using a promotion and marketing service configured to illustrate or otherwise inform consumers of the availability of the promotion.

BACKGROUND

Merchants sell goods, services and/or experiences, also known as products, to consumers. The merchants, also known as providers, can often control the form of their product offers, the timing of their product offers, and the price at which the products will be offered. The provider may sell products at a brick-and-mortar sales location, a virtual online site, or both.

Promotions have been used as part of some retail strategies. Promotion techniques include providing instruments that result in rebates to potential consumers, but these techniques have several disadvantages. In this regard, a number of deficiencies and problems associated with the systems used to, among other things, provide and redeem promotions used by consumers have been identified. Through applied effort, ingenuity, and innovation, many of these identified problems have been solved by developing solutions that are included in embodiments of the present invention, some examples of which are described herein.

BRIEF SUMMARY

In general, example embodiments of the present invention provide herein systems, methods and computer readable storage media for facilitating the generation of promotions based on generated promotion templates by a promotion and marketing service for a provider of goods, services, experiences and/or the like in a simple and user-friendly manner. Among other things, embodiments discussed herein can be configured to generate a promotion from a provider's proposed terms, one or more determined terms and/or the like. Some embodiments may be configured to receive data corresponding to at least one provider characteristic, generate a promotion based on a promotion template, and transmit data corresponding to the promotion to an interface for the provider to review and accept.

Some embodiments discussed herein can be configured to aid a promotion and marketing service to normalize and/or categorize promotion templates, which promote the efficient creation of promotions for one or more providers. Some embodiments may be configured to aid a promotion and marketing service in defining provider characteristics, such as a provider service category, and/or other characteristics associated with a provider so as to assign certain promotion templates to certain services.

Other systems, methods, and features will be, or will become, apparent to one with skill in the art upon examination of the following figures and detailed description. It is intended that all such additional systems, methods, features and be included within this description, be within the scope of the disclosure, and be protected by the claims that follow.

BRIEF DESCRIPTION OF THE DRAWINGS

Figure 1:
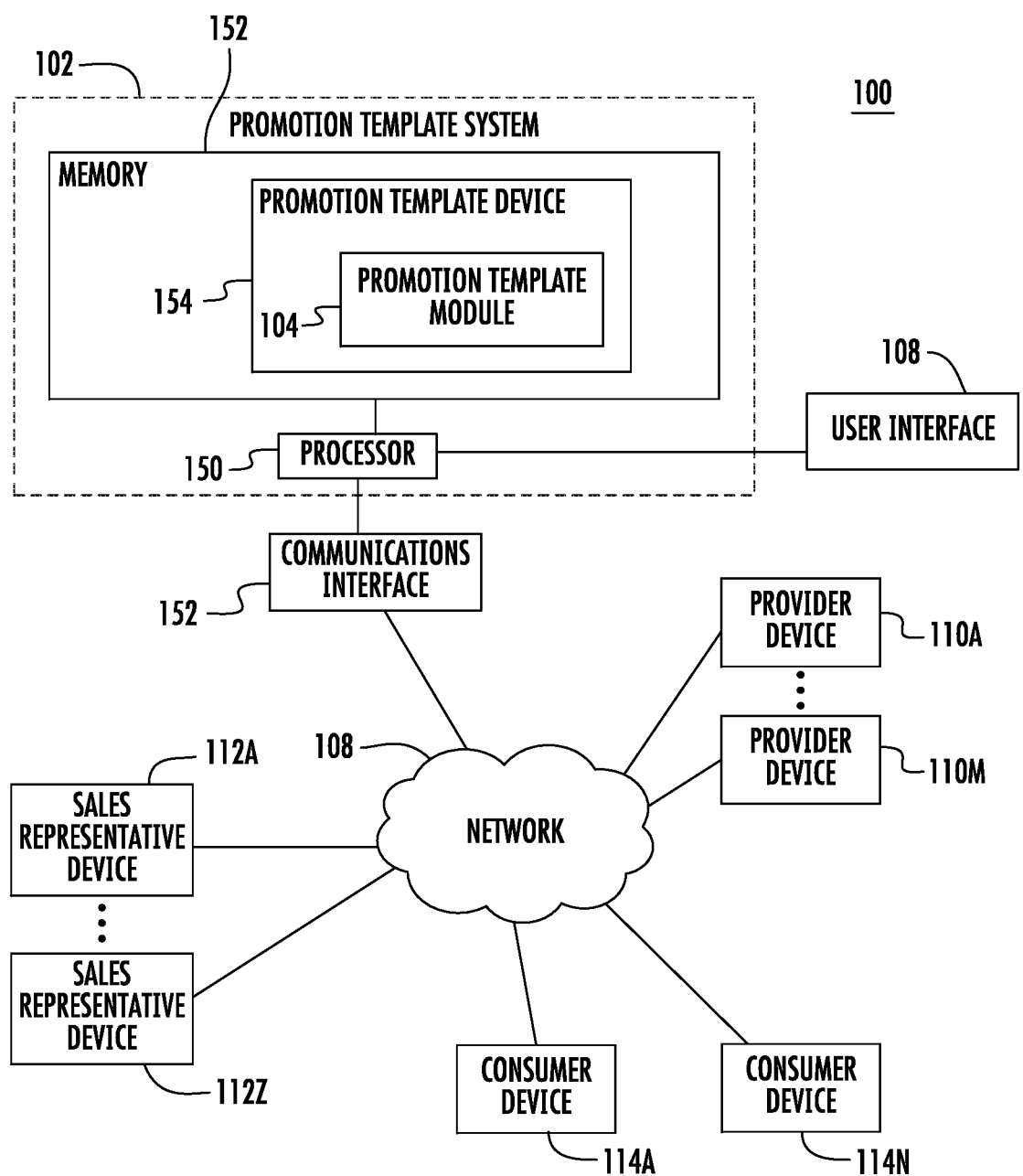
Figure 2:
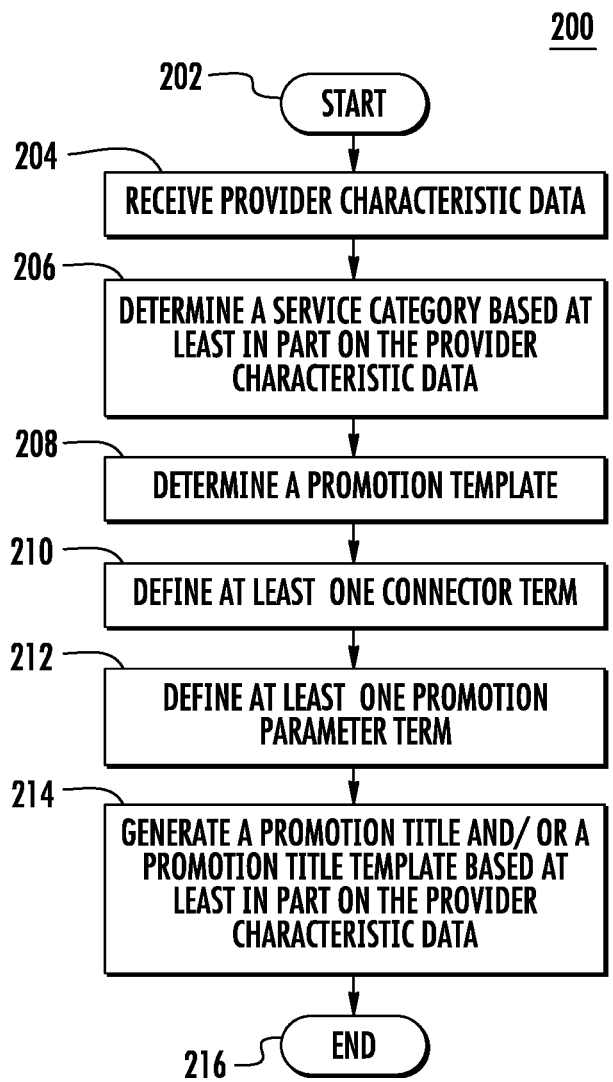
Figure 3:
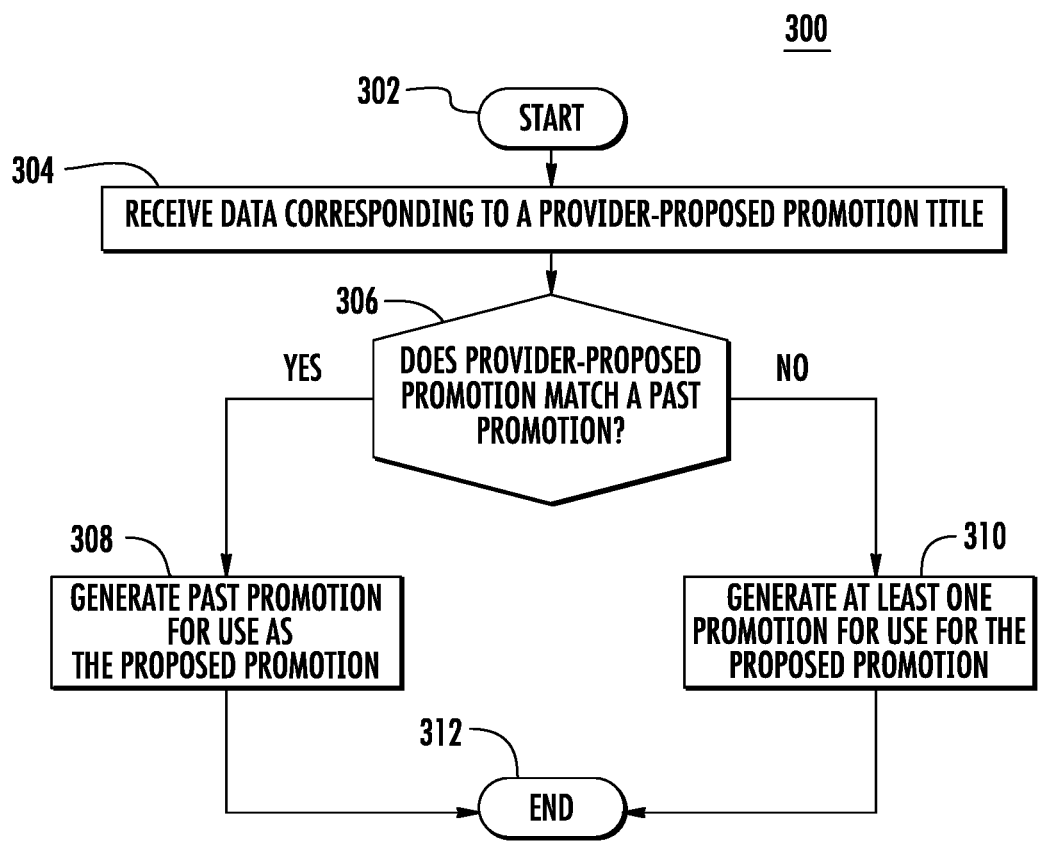
Figure 4:
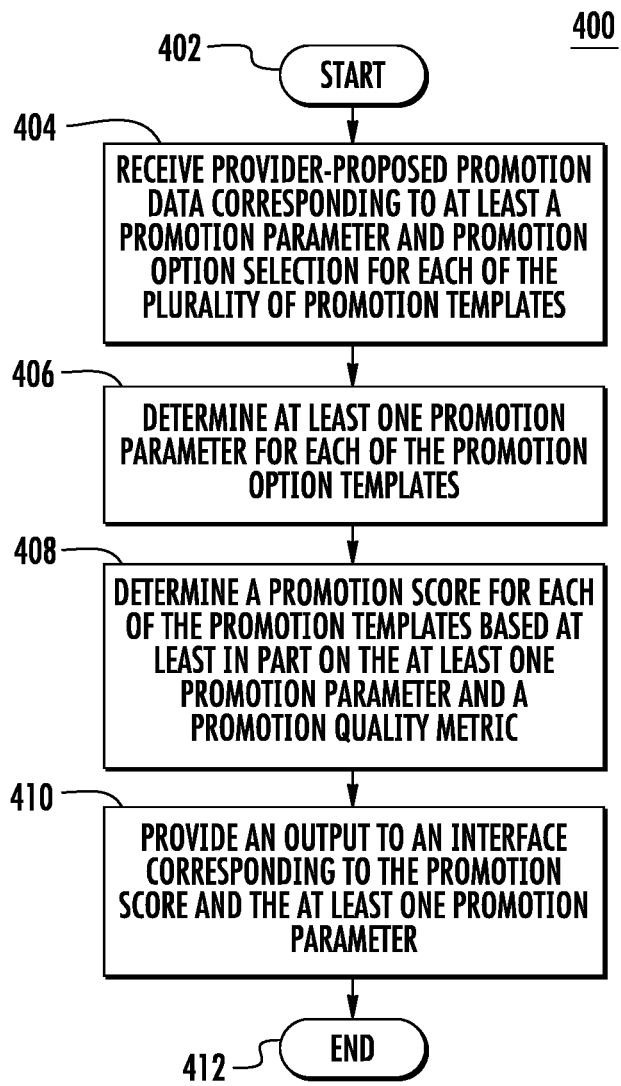
Figure 5:
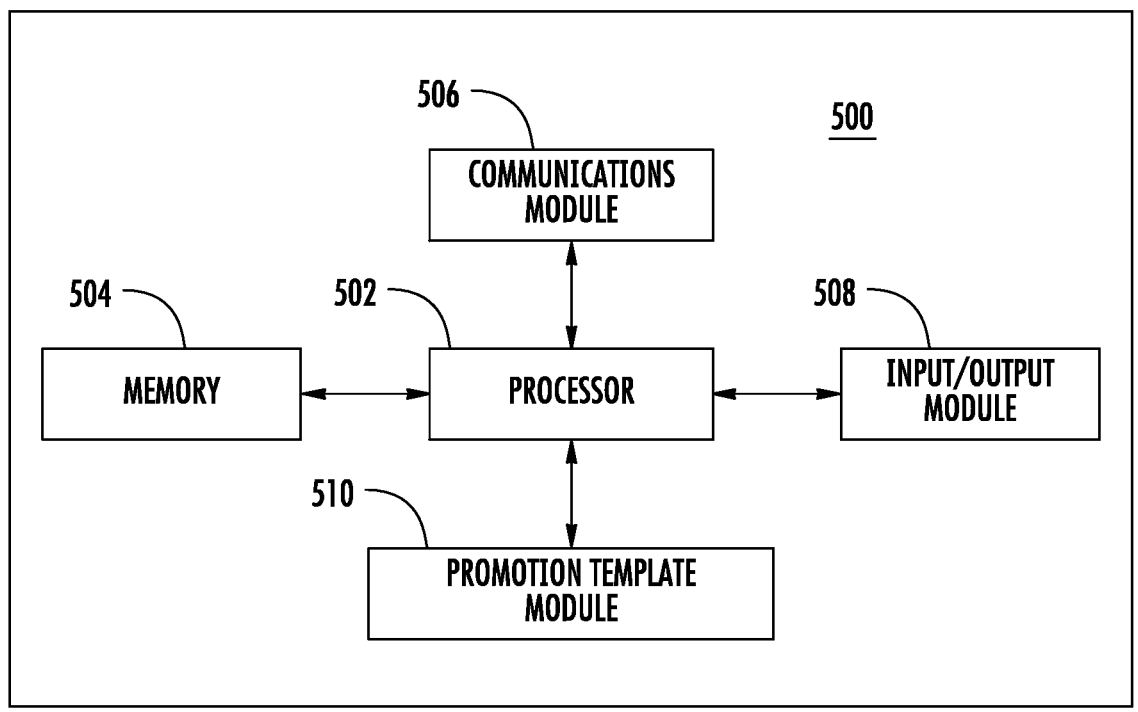

Having thus described embodiments of the invention in general terms, reference will now be made to the accompanying drawings, which are not necessarily drawn to scale, and wherein:

FIG. 1 illustrates an example system in accordance with some embodiments discussed herein;

FIG. 2 illustrates a flow chart detailing a method of generating a promotion template according to an example embodiment;

FIG. 3 illustrates a flow chart detailing a method of generating a promotion according to an example embodiment;

FIG. 4 illustrates a method of scoring a plurality of promotion templates according to an example embodiment; and FIG. 5 illustrates a block diagram of circuitry which may be included in a promotion template system and/or a mobile device according to an example embodiment.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different, or fewer components may be provided.

As used herein, the term "provider," "merchant," and similar terms may be used interchangeably to refer to, but not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a spa company that that provides health and beauty services to a consumer.

In addition, as used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using a spa company as the example provider, is $25 for $50 toward running spa services. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the spa company promotion as an example, the accepted value is $25 and the promotional value is $50. In this example, the residual value may be equal to the accepted value.

In addition, as used herein, the term "promotion and marketing service" may include, but is not limited to, a service that is accessible via one or more computing devices and is operable to provide example promotion and/or marketing services on behalf of one or more providers that are offering one or more instruments that are redeemable by consumers for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the spa company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impressions" may include, but is not limited to, a communication, a display, or other perceived indication, such as a flyer, print media, e-mail, text message, application alert, mobile applications, other type of electronic interface or distribution channel and/or the like, of one or more promotions. For example, and using the aforementioned spa company as the example provider, an e-mail communication sent to consumers that indicates the availability of a $25 for $50 toward spa services promotion.

Overview

As discussed herein, a provider of goods, services, experiences and the like (e.g. a spa company that provides spa and health services and products) may engage with a promotion and marketing service for providing promotion and/or marketing services on behalf of the provider. For example, the promotion and marketing service may transmit to a number of consumers impressions associated with a promotion for a good, service, and/or the like provided by a provider (e.g., an e-mail indicating a consumer may purchase $40 worth of spa services from Acme Spa Company for $20). In addition, the promotion and marketing service may accept payments for the promotion from a consumer and issue a promotion instrument to a consumer for the payment. Accordingly, the consumer may present and redeem the promotion instrument to the provider in exchange for goods or services (e.g., the consumer may visit an Acme Spa Company location and obtain $40 worth of spa services by presenting the $20 for $40 promotion instrument). In exchange for providing the promotion and/or marketing service, the promotion and marketing service may retain a portion of the revenue received from the consumer and provide the provider with the remainder of the revenues (e.g. the marketing and promotion service may retain $5 of the $20 and provide Acme Spa Company with $15 of the $20 paid by the consumer for the instrument).

In some example embodiments, the method, apparatus and computer program product is configured to enable the registration of a merchant with the promotional system to enable the merchant to create and/or publish a promotion via the promotion and marketing service. In some examples, and upon sign in or identification one or more attributes or characteristics associated with the merchant that may be used to identify a set of promotion parameters for suggesting a promotion or identifying a promotion template for the merchant. For example, the attributes or characteristics may include, but are not limited to, a the type of industry of the merchant, the type of products or services sold by the merchant, the size of the merchant, the location of the merchant, the sales volume of the merchant, reviews and ratings for the merchant, or the like. In some embodiments, the attributes or characteristics are a result of analytics that allow for generation of promotions that are ideal for the particular merchant's circumstances. For example, the attributes or characteristics may be used to identify optimal promotions and/or promotion templates for the particular merchant based on their exact location (e.g. the particular city street of the merchant as opposed to a wider range, such as a zip code), the merchant's exact products and services offered (e.g., pizzerias that only serve deep dish pizza, restaurants that become nightclubs after 11:00 pm), the merchant's price point (e.g., barbershops that charge more than $20 for a haircut), or the like. These merchant self-service indicators may be used to identify deal parameters that were used by other merchant s that share one or more same or similar attributes or characteristics.

For example, after an initial registration and verification, attributes or characteristics that associated may be verified for the newly registered merchant, such as by looking up the merchant in a merchant database or by receiving the attributes or characteristics directly from the merchant (e.g., by a fillable form). The identified attributes or characteristics may be cross-referenced with promotion offers from other merchants to identify deal offers that were successful for other merchants with the same or similar attributes or characteristics. Successful deal offers for merchants with similar attributes or characteristics may be used to generate a suggested promotion or to select a preferred promotion template for the newly registered merchant, and the newly registered merchant may confirm the suggested promotion to offer the promotion to consumers via the promotion and marketing system. The promotion and marketing system may also provide an interface allowing the merchant to edit or otherwise modify the suggested promotion before confirmation. Example embodiments of a system and method for merchant self-service are described further with respect to at least U.S. patent application Ser. No. 13/749,272 filed Jan. 24, 2013, which are herein incorporated by reference in its entirety.

Embodiments discussed herein may be configured to provide for generating a promotion based on a promotion template (e.g., a grammar defined by a sequence of variables that concatenate\generate a particular promotion or promotion title) for a particular promotion provided to a consumer by the provider and/or the promotion and marketing service. According to some embodiments, a provider may have a number of provider characteristics or attributes, which may include the type of goods and/or services the provider provides (i.e., a category, a sub-category, a service category), the provider location (i.e., the city, neighborhood, state, a defined local area and/or the like), the provider name (e.g., Acme Spa Company), and/or the like. In some embodiments, a promotion and marketing service may define a provider characteristic for a provider, such as a provider's service category. For example, a promotion and marketing service may determine a provider (e.g., Acme Spa Company) that solely provides spa services would be categorized in a particular service category, such as "Spa Services-Massage," rather than another particular service category, such as "Health and Beauty," as this particular provider does not provide any hotel accommodations. In another embodiment, a promotion and service provider may determine a number of primary service categories and sub-categories (i.e., a service taxonomy).

Various embodiments of the invention are directed to determining and/or generating a promotion, using a promotion template, based at least in part on a number of provider characteristics. Said differently, such embodiments are directed to generating a promotion that will advantageously maximize particular revenues, bookings, consumer purchases, promotion redemptions and/or the like. In some example embodiments, a promotion template may be selected to maximize return on investment (ROI). Example embodiments of a system and method for determining and providing provider ROI information are described further with respect to U.S. Provisional Patent Application 61/824,850 filed May 17, 2013 and U.S. patent application Ser. No. 13/841,347 filed Mar. 15, 2013, which are herein incorporated by reference in its entirety.

Embodiments may also be directed to determining a score and/or ranking for a particular promotion template. In this regard, one advantage that may be realized by some embodiments discussed herein is that determining a promotion template for a particular promotion that may increase the efficiency of a promotion and marketing service for providing a number of promotions for a number of providers. Further, embodiments may advantageously provide for determining particular promotion templates that may produce increased consumer interaction with a particular provider.

Example embodiments may also be directed to the generation of promotion templates themselves. In such examples, the method, apparatus and computer product may analyze one or more historical promotions (e.g., historical performance data) in each of the one or more services in the service taxonomy to generate promotion templates. In some examples, a corpus (e.g., one or more previously run promotions in each of the one or more defined services within the service taxonomy) of previous promotions may be analyzed and one or more regular expressions may be used to parse the corpus. As such, the method, apparatus and computer product may generate optimized promotion templates for a particular promotion, promotion type, service, local area and/or the like. As described above these generated templates may be analyzed and selected based on a provider's category, sub-category, service, location or the like.

The foregoing description applies the inventive concepts herein described to generate an exemplary promotion, based on a promotion template, for a promotion. This application is provided for ease of illustration and is not intended to limit the scope of the claimed subject matter. Indeed, as will be apparent to one of ordinary skill in the art in view of this disclosure, the inventive concept herein described may also be applied to other promotion characteristics.

FIG. 1 illustrates a system 100 including an example network architecture, which may include one or more devices and sub-systems that are configured to implement some embodiments discussed herein. For example, system 100 may include promotion template system 102, which may include, for example, a processor 150, a memory 152, a promotion template computing device 154, and a promotion template module 104. Promotion template module 104 can be any suitable network server and/or other type of processing device, such as a promotion template computing device 154. As discussed herein, the provider device 110A, 110M, the sales representative device 112A,112Z, and/or the consumer device 114A, 114N may be any suitable mobile device, such as a cellular phone, tablet computer, smartphone, etc., or other type of mobile processing device that may be used for any suitable purpose.

Promotion template system 102 may be coupled to one or more of the provider devices 110A, 110M, sales representative devices 112A, 112Z, and/or consumer devices 114A, 114N, (e.g., mobile device) via a communications interface 152 that is configured to communicate with network 108. In this regard, network 108 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 108 may include a cellular telephone, a 802.11, 802.16, 802.20, and/or WiMax network. Further, the network 108 may include a public network, such as the Internet, a private network, such as an intranet, or combinations thereof, and may utilize a variety of networking protocols now available or later developed including, but not limited to TCP/IP based networking protocols.

In some example embodiments, the promotion template system 102 may be configured to use one or more learning models to generate and test one or more promotion templates for each of the one or more services in a defined service taxonomy. In some examples, the promotion template system 102 may be configured to analyze one or more historical promotions, such that each of the one or more historical promotions are assigned a primary service. A promotion title of the one or more historical promotions are then normalized (e.g., based on the one or more normalization methods described herein). The normalized title for each of the promotions is then parsed to extract the promotional value, the actual value, one or more benefits, connectors, editorial comments and or the like. Such parsing may make use of generated regular expressions (e.g., a set of rules that match or otherwise identify one or more text structures within processed documents and are advantageously generalized so as to follow a standardized process to extract information or text from the processed documents, the set of rules are determined, in some examples, based on the different text components to be parsed) or other language processing means. The parsing may be verified, in some examples, by attempting to recreate the promotion title based on the parsed elements. In an instance in which the parsing is verified, the template, and its identified primary service, is stored for later use. As is described herein, a promotion template may then be selected for use in generating a promotion based on one or more factors further detailed hereinafter.

In further examples, promotion templates may be generated and/or instantiated in such a way that they include meta-data that may be configured to aid in defining the use of the template in one or more clients or systems. For example, a given promotional value (e.g. "60 minute massage" or "what you get") may comprise time meta-data (e.g., "60 minutes" that can be labeled as a "time") that may be used in conjunction with a scheduling, calendaring or availability engine. Whereas a promotional value that identifies a quantity of a service to be performed may be used by an inventory engine or resource planning engine. Alternatively or additionally other meta-data may identify particular promotion options, promotion constraints, promotion parameters and/or the like.

In further example embodiments, the promotion templates may be designed for use in multiple different languages or dialects (e.g. i18n/l10n or the like). In such cases, the promotion templates may be translated, instead of the promotion itself, from a first language to a second language and allow for the construction of the promotion in the second language via a user interface or the like. Such a method results, in some examples, in a higher level of translation accuracy and readability when compared to a conversion of the promotion itself from the first language two the second language.

FIG. 2 illustrates a flow chart for an example embodiment of a method 200 of generating a promotion and/or a promotion title. In some example embodiments, and in order to generate such a promotion, a provider, a salesperson or the like may access a web-based interface via a provider device, such as a mobile device, a smartphone, a laptop, a mobile computing device, a tablet computing device, and/or the like, and provide information corresponding to a promotion the provider wishes to offer. Based on the provided data, promotion templates may be identified and displayed for the provider for instantiation. Alternatively or additionally, the promotion template system may dynamically instantiate the promotion template with recommended promotion terms.

Method 200 may begin at 202 and proceed to 204, where a promotion template system may receive provider characteristic data from a mobile device, such as a provider device 110A, via an interface, from a sales system and/or the like. For example, a provider may access a secure web-based provider interface and transmit provider characteristic data to the promotion template system. The provider may transmit provider characteristic data, such as registration information, provider name, provider service category, provider location, and/or the like via a provider device 110.

In some embodiments, the provider may initially make the provider characteristic data available by pre-registering as a provider with the promotion and marketing service. Accordingly, subsequent transactions may not require the provider to provide provider characteristic data to the promotion template system. In another embodiment, the provider may provide provider characteristic data to the promotion template system in real-time to support a generation of a promotion (i.e., if the provider has not pre-registered or if, for example, the provider is a mobile provider and changes locations from time to time, in an instance in which the provider offers multiple services, in an instance in which the provider has added new services and/or the like). In an example embodiment, a provider characteristic may include the name of the provider that provides a good, service, or experience to the consumer. Alternatively or additionally, provider information may be accessed via a provider database, may be generated by analyzing the provider name, based on characteristics of the provider determined using historical promotions, websites, rating services, social networks or the like. In some examples, provider information may be confirmed using one or more of the aforementioned methods.

At 206, the promotion template system may be configured to determine a service category based at least in part on the provider characteristic data. In this regard, a promotion template system may be configured to determine a service category based at least in part on data corresponding to a provider name or other indications otherwise determined in light of the provider characteristic data. For example, the provider name may include information corresponding to the provider service category (e.g., Acme Spa Company having the word "Spa" in the provider name).

Alternatively or additionally, and according to some embodiments, the promotion template system may be configured to determine a provider service category by the provider name. For example, a provider may be have been previously assigned a provider service category upon the provider historical data, previous promotions, previous registrations and/or the like. As such, when a promotion template system receives provider characteristic data corresponding to the provider's name, the promotion template system may be configured to determine the value of the provider service category that was previously assigned to the provider upon pre-registration.

At 208, the promotion template system may be configured to select a particular promotion template. The promotion template is selected as a function of the determined service in block 206 and/or one or more additional provider characteristics. Determination and/or selection of a particular promotion template is further defined with respect to FIG. 4.

At 210, the promotion template system may be configured to define at least one connector term for the selected promotion template. For example, the connector term may include at least one of a basic connector term and a descriptor connector term. In this regard, a promotion template may consist of a sequence of variables that, when concatenated, will produce a promotion. As such, basic connector terms may include a number of words and/or phrases that may be used in a promotion and/or a promotion template. For example, a basic connector term may include words and/or phrases, such as "for", "at", "get", "buy", "worth of", "of", "off", "spend", and/or the like.

In some example embodiments, the promotion template system may be configured to define or otherwise implement a grammar (e.g. set of structural rules that govern the composition of clauses, phrases and words in any given language). In some examples, the grammar defined by the template system may be configured to adapt one or more connectors or other words or phrases in the promotion template based the defined or otherwise implemented grammar. For example, the use of "a/an" may depend on the subsequent word or phrase. Other such modifications of a promotion template by the promotion template system may also be performed, such as, but not limited to modifying a word or phrase to be plural or singular, addition of punctuation, modification of syntax or word ordering and/or the like.

In some embodiments, the connector term may include at least one descriptor connector term. In this regard, the promotion template system may be configured to define at least one descriptor connector term that may correspond to a particular provider service category or may include one or more editorial comments about the particular service category or provider. In some embodiments, a descriptor connector may correspond to multiple provider service categories. For example, a descriptor connector term may consist of a number of words and/or phrases that may be used to describe the promotion. According to some embodiments, the descriptor connector term may describe the provider service category. In some embodiments, the descriptor connector term may correspond to the goods, services, and/or experiences being provided by the provider in the promotion. For example, a promotion generated based on a promotion template for a provider, such as Acme Spa Company, may include a descriptor connector such as "spa services", "spa products" "renowned spa in the downtown area" and/or the like.

In some example embodiments, the descriptor connector term may be instantiated via one or more editorial descriptions that may have been previously determined to be or otherwise have been learned to be influential on a consumer's likelihood of purchasing a particular promotion. While, such phrases or terms may be developed using supervised learning methods, such terms may also be generated based on user comments with respect to the provider, third party reviews, website or blog comments, social networking comments and/or the like.

At 212, the promotion template system may be configured to define at least one promotion parameter term. According to some embodiments, the promotion parameter term may include at least one of a promotional value and an accepted value. In this regard, the promotional value may correspond to the value of the goods, services, and/or experience the provider is providing the consumer in the promotion (i.e., "what you get"). The accepted value may correspond to the price of the promotion the consumer pays for the promotion value (i.e., "what you give"). For example, a promotion offering $40 worth of spa services for $20 would have a promotional value of $40 and an accepted value of $20.

At 214, a promotion template system may be configured to generate a promotion by instantiating the promotion template using, at least in part, provider characteristic data, such as the provider name and/or the provider service category. In some embodiments, the promotion template system may generate a promotion containing at least one connector term, at least one descriptor term, at least one promotion parameter term.

By way of example, in conjunction with the steps described above, after receiving provider characteristic data, such as the provider name (e.g., Acme Spa Company), the promotion template system may determine a provider service category (e.g., Spa Services) that corresponds with the particular provider. The promotion template system may then generate a promotion that corresponds with the particular provider service category that consists of, for example, a number of connector terms, at least one descriptor term, and a number of promotion parameter terms. For example, the promotion template system may determine a number of connector terms, such as "for", "at", and "worth of", that correspond to the particular provider service category.

In addition, the promotion template system may determine a number of promotion parameter terms, such as a promotional value and an accepted value, that correspond to the particular provider service category. In this regard, a promotion parameter system may determine a plurality of promotion parameter terms, such as a promotional value of $40 and an accepted value of $20. According to some embodiments, the promotion parameter system may determine a descriptor term (e.g., "Spa Treatments") that corresponds with the particular provider service category (e.g., Spa Services). Accordingly, at 212, the promotion template system may be configured to generate a promotion by sequentially concatenating the plurality of connector terms, the descriptor term, the plurality of promotion parameter terms, and/or the provider name. For example, the promotion template system may be configured to generate a promotion, such as "$20 for $40 worth of Spa Treatments at Acme Spa Services." Accordingly, the promotion includes the sequential concatenated plurality of connector terms, a descriptor term, a plurality of promotion parameter terms, and/or the provider name. Specifically, the promotion includes, in order, a accepted value "$20", a connector term "for", a promotional value "$40", a connector term "worth of", a descriptor term "Spa Treatments", a connector term "at", and the provider name "Acme Spa Services."

According to some embodiments, the promotion template system may be configured to generate multiple promotion options (e.g., values that a particular promotion template may use to complete its terms). For example, the promotion template system may be configured to generate a promotion for a first promotion option having a promotion value of $40 and a promotion price of $20 and a second promotion option having a promotion value of $100 and a promotion price of $50. Alternatively or additionally, the promotion template may have a first price for a first service and a second price for a second service (e.g., $100 for painting a single room, $150 for painting two rooms). One of ordinary skill in the art, in light of this disclosure, may appreciate the promotion template system may be configured to generate a plurality of promotions corresponding to a plurality of promotion options and/or a variety of promotion types.

FIG. 3 illustrates a flow chart for an example embodiment of a method 300 of generating a promotion from a provider-proposed promotion in a number of ways. Method 300 may start at 302. At 304, a promotion template system may receive data corresponding to a provider-proposed promotion. For example, a provider may access a web-based secure provider interface via a provider device, such as a mobile device, a smartphone, a laptop, a mobile computing device, a tablet computing device, and/or the like, and provide information corresponding to provider characteristics, such as the provider name, provider service category, and/or the like. In some embodiments, the provider may provide information corresponding to particular promotion parameters for a promotion the provider wishes to offer. Further still, a provider may provide information corresponding to a provider-proposed promotion the provider wishes to use for the particular provider-proposed promotion.

At 306, a promotion template system may be configured to determine if a provider-proposed promotion matches a past promotion. For example, a provider (e.g., Acme Spa Services) may wish to use a promotion and marketing service for a particular promotion (e.g., "$20 for $40 worth of Spa Treatments at Acme Spa Services"). As such, the provider may provide information corresponding to the provider-proposed promotion to the promotion template system. The promotion template system may receive data corresponding to the provider-proposed promotion, such as a provider-proposed promotion parameter, and determine that a past promotion corresponds to the provider-proposed promotion.

If the proposed promotion matches the past promotion, the promotion template system may be configured to generate the past promotion for use as a proposed promotion at 308. In this regard, if the promotion template system determines a past promotion (e.g., "$20 for $40 worth of Spa Treatments at Acme Spa Services") matches the proposed promotion (e.g., "$20 for $40 worth of Spa Treatments at Acme Spa Services"); the promotion template system may generate the past promotion for use for the current proposed promotion.

If the provider-proposed promotion does not match a past promotion, the promotion template system may be configured to generate at least one proposed promotion from a promotion template for use at 310. For example, a provider-proposed promotion (e.g., "$20 for $40 worth of Spa Treatments at Acme Spa Services") may not match a past promotion (e.g., "Get $100 worth of Spa Goods at Acme Spa Services for $75"). In this regard, the past promotional value (e.g., $100), the past accepted value (e.g., $75), and the descriptor term (e.g., "Spa Goods") do not match at least one descriptor term, accepted value, and/or promotional value of the provider-proposed promotion.

As such, the promotion template system may be configured to extract and/or normalize a provider-proposed promotion for various connector terms, promotion parameter terms, and/or descriptor terms so as to determine if a provider-proposed promotion matches a past provider promotion. In this regard, a promotion template system may be configured to determine a provider-proposed promotion parameter, such as a promotional value, does not match a past promotion parameter. Accordingly, the promotion template system may be configured to determine various terms of a provider-proposed promotion and generate a proposed promotion from a plurality of promotion templates, as discussed herein. In some embodiments, the promotion template system may be configured to query a provider for data corresponding to promotion parameter terms and/or descriptor terms, as discussed in greater detail below.

In some embodiments, the promotion template system may be configured to compare a provider-proposed promotion with a plurality of promotion templates that correspond to a particular provider service category. As such, according to some embodiments, the promotion template system may be further configured to receive data corresponding to the provider, such as provider characteristic data. Provider characteristic data may include a provider name, a provider service category and/or the like. Accordingly, the promotion template system may be configured to receive data corresponding to a provider-proposed promotion and compare the provider-proposed promotion data with promotion templates associated with a particular provider service category.

According to some embodiments, a service category may include one or more promotion templates. For example, a popular and/or highly-ranked service category, such as "Food and Drink" with a service "Food-Chinese" for example, may include multiple promotion templates for use in generating a promotion for a provider, while a less popular and/or less diverse service category may have a single promotion template associated with the service category. As such, the promotion template system may have a number of promotion templates for use in generating a promotion for providers associated with highly-ranked or popular service categories, while having a minimal or singular amount of promotion templates for use in generating a promotion for providers associated with lower-ranked or less diverse service categories.

Turning to FIG. 4, FIG. 4 illustrates a method of scoring and/or ranking a plurality of promotion templates. The method 400 may start at 402. At 404, a promotion template system may receive promotion data corresponding to at least one promotion parameter. For example, the promotion template system may receive promotion data corresponding to a promotion option selection. In this regard, a promotion may include a single option or multiple options. For example, a single option promotion may provide a consumer with a single promotion (e.g., "$20 for $40 worth of Spa Services at Acme Spa Company"). In another embodiment, a multiple option promotion may provide a consumer with multiple promotions to choose from (e.g., "$20 for $40 worth of Spa Services at Acme Spa Company; $50 for $100 worth of Massage Services at Acme Spa Company"). In some examples, multiple option promotions may comprise templates that define a promotion title that is inclusive of the multiple options and one or more editorial comments that define each option of the multiple options (e.g., title: "Discount Spa Services at High End Spa" editorial comments: "$45 dollar Swedish massage, $65 facials"). In some cases, instrument options may be considered.

At 406, the promotion template system may be configured to determine a promotional value for each of the promotion templates. For example, the promotion template system may be configured to determine at least one promotion parameter for each of the promotion option templates. For example, in some embodiments, the promotion parameter may correspond to a promotional value (e.g., "60 minutes", "$40", etc.). In this regard, some promotions may provide an amount of service time as the promotional value for a promotion price (e.g., "$40 for 1 hour massage at Acme Spa Company"). In another embodiment, some promotions may provide a monetary-equivalent amount as the promotional value for a promotion price (e.g., "$40 for $80 worth of Spa Goods at Acme Spa Company"). As such, embodiments of the present invention may be configured to determine at least one promotion parameter for each of the promotion option templates.

In addition, some example embodiments may provide for the normalization and/or standardization of promotion parameters and/or promotion options for each of the promotion templates. For example, when a promotional value provides an amount of service time (e.g. "1 hour"), the promotion template system may be configured to normalize the promotional value for standardization across all promotion templates for a particular service category. In this regard, the promotion template system may be configured to normalize the promotional value to indicate the amount of service time in minutes (e.g., "$40 for 60 minute massage at Acme Spa Company"). Accordingly, when compared to another promotion template in a multiple promotion offer, the promotional values are standardized for use in generating promotions. For example, another promotion template within the same service category of "Spa Services" may include a promotion template for "$25 for 30 minute massage at Acme Spa Company". As such, the promotion templates are standardized for use in generating promotions for a particular provider.

Further still, the promotion template system may be configured to determine a promotion score for each of the promotion templates at 408. In this regard, the promotion template system may determine a promotion score for a single-option promotion and/or a multiple option promotion for a provider. In some embodiments, the promotion score may be based upon, at least in part, on the at least one promotion parameter and a promotion quality metric.

For example, a promotion template system may receive provider-proposed promotion data corresponding to a promotion parameter and a promotion option selection, as previously stated at 404. In this regard, the promotion template system may receive provider-proposed promotion data corresponding to a multiple-option promotion having two promotional values (e.g., "$40 for $80 worth of Spa Goods; $80 for $175 worth of Spa Goods"). As such, the promotion template system may be configured to determine the provider-proposed promotion is a multiple option promotion that includes two promotional values of $80 and $175 for Spa Goods. Based on past promotion redemption rates, consumer purchases of promotions, consumer reviews of the provider, length of the promotion offer before selling out, and/or the like, the promotion template system may be configured to determine a promotion score for the specific promotion template that includes a multiple option promotion having two promotional values of $80 and $175 for Spa Goods.

In some example embodiments, the promotion template system may be configured to generate a score for a particular promotional value (e.g., what you get) to be included in the promotion. As such, the promotion template system may then be configured to provide not only a recommended promotion, but recommended promotion parameters as well. In one example embodiment, promotional value recommendations may be generated based on a learning model that continually analyzes historical promotions. For example, for each promotion option within each promotion, a primary service related to that a particular option may be identified. The promotion title for the particular promotion may be normalized (e.g., using the normalization procedures described herein). The normalized title may be parsed to identify the promotional value portion, such as by using regular expressions or other natural language processing means. A promotion performance score or promotion quality metric (e.g., ebpm) may be accessed for that particular option of the promotion. The promotion performance score, the promotional value and the primary service may then be stored for use, such as the use described with respect to FIG. 4. Alternatively or additionally, actual value, descriptors and/or connectors may be discovered and ranked using the same or similar methodologies.

At 410, the promotion template system may be configured to provide a promotion score that corresponds to the at least one promotion parameter and/or promotion option selection to an interface so as to be displayed to a provider. In this regard, the promotion template system may determine that a multiple option promotion, wherein the promotion values do not correspond by a factor of 2 (i.e., doubling the first promotion value of $80 provides $160, and not $175), is not successful, and thus is associated with a lower promotion score. The promotion template system may be configured to provide the lower promotion score to the provider via an interface configured to display the promotion score. In some embodiments, the promotion template system may be further configured to provide additional options (i.e., other proposed promotions) and those promotion templates respective promotion scores to the provider via the interface.

In some embodiments, promotion score may be based at least in part on the frequency a particular promotion is used within a particular provider service category (e.g., service in a service taxonomy). In some embodiments, the scoring for a particular provider service category may be defined by the following equation:

$$\text{score}_{k,g} = \log\left(1 + \{\text{average } ebpm\}_k \times \left(\frac{N_{g,k}}{M_k}\right)\right)$$

Wherein $N_{g,k}$ is the frequency of a promotion in a group g (i.e., the promotional value) within the provider service category k. $M_k$ is the total number of promotions considered in a provider service category k. In addition, $$\text{average } ebpm_k = \frac{1}{|\text{options}_k|} \sum_{i \in \text{options}_k} ebpm_i,$$

where the $\text{options}_k$ are the number of promotion options within a provider service category k. Further, ebpm=1000* (option booking amount/engg impressions), which is calculated for each of the individual promotion options and is normalized by the total number of promotion impressions.

In another embodiment, the promotion score may be based at least in part on the total amount of the promotion value instead of the promotion value per promotion. According to some embodiments, the promotion score may be based at least in part on a total promotion value amount computed over a period of time.

Further still, in some embodiments, the promotion template system may be configured to determine a promotion score based at least in part on the frequency and/or probability of receiving a particular promotional value having a particular promotion value for any of the provider service groups. This may be defined by the following equation:

joint prob score$_{i,k,g}$=log(1+{average ebpm}$_k$)×($N_{g,k}$/$M_k$)×($N_{i,g,k}$/$M_k$)

The joint prob score$_{i,k,g}$ considers the joint probability of getting a particular good, service or experience in a promotion in a particular group g for a particular provider service category k.

In another embodiment, the promotion template system may be configured to determine a promotion value score based at least in part on other ranking structures as discussed previously. For example, in some embodiments, a promotion value score may be determined by determining a trade-off score between the likelihood that a particular promotion value is used compared to a contribution to the total ebpm, as defined by the equation below.

$$\text{tradeoff score}_{g,k} = \alpha \times (N_{g,k}/M_k) + $$
$$(1-\alpha) \times [\log(1 + \{\text{average } ebpm\}_k)] \Big/ \sum_k \log(1 + \{\text{average } ebpm\}_k)$$

In other example embodiments, reinforcement learning models may be used to determine ranking structure for particular promotion templates. The acceptance of the ranked/proposed values for quantity could be considered as input for the following period. As such, various embodiments of the present invention may advantageously provide for scoring and/or ranking of various promotion templates for each of the provider service categories so as to generate promotions that provide a provider with the greatest benefits.

Exemplary System Architecture

FIG. 6 illustrates a schematic block diagram of circuitry 600, some or all of which may be included in, for example, promotion template system 102 and/or provider device 110. As illustrated in FIG. 6, in accordance with some example embodiments, circuitry 600 may include various means, such as a processor 602, memory 604, communication module 606, input/output module 608 and/or promotion template module 610.

In some embodiments, such as when circuitry 600 is included in a promotion template system 102 and/or mobile device 110, promotion template module 610 may be included. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments, processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. As another example, when processor 602 is embodied as an executor of instructions, such as may be stored in memory 604, the instructions may specifically configure processor 602 to perform one or more algorithms and operations described herein.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data, applications, instructions, or the like for enabling circuitry 600 to carry out various functions in accordance with example embodiments discussed herein. For example, in at least some embodiments, memory 604 is configured to buffer input data for processing by processor 602. Additionally or alternatively, in at least some embodiments, memory 604 may be configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 2602, such as via a bus. Communications module 606 may include, for example, an antenna, a transmitter, a receiver, a transceiver, network interface card and/or supporting hardware and/or firmware/software for enabling communications with another computing device. Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user. Some example visual outputs that may be provided to a user by circuitry 600 are discussed in connection with the displays described above. As such, input/output module 608 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine (e.g., consumer device and/or merchant device) or other type of device designed for complex user interactions. In some embodiments (like other components discussed herein), input/output module 608 may even be eliminated from circuitry 600. Input/output module 608 may be in communication with memory 604, communications module 606, and/or any other component(s), such as via a bus. Although more than one input/output module and/or other component can be included in circuitry 600, only one is shown in FIG. 6 to avoid overcomplicating the drawing (like the other components discussed herein).

Promotion template module 610 may also or instead be included and configured to perform the functionality discussed herein related to facilitating the generation of a promotion and/or a promotion template, as discussed above. In this regard, the example processes and algorithms discussed herein can be performed by at least one processor 602 and/or promotion template module 610. For example, non-transitory computer readable storage media can be configured to store firmware, one or more application programs, and/or other software, which include instructions and other computer-readable program code portions that can be executed to control processors of the components of system 600 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

That which is claimed:

1. A method for programmatically updating a web-based interface based on applying a learning model to promotion templates, the method comprising:

providing access to the web-based interface, the web-based interface configured for receiving information corresponding to a promotion a provider wishes to offer;

receiving a request for the promotion from the provider using the web-based interface configured for promotion generation, the request comprising at least an identification of the provider and an identification of at least one good or service that is to be included in the promotion;

accessing, in real-time, provider characteristic data for a dynamic instantiation of a selected and displayed promotion template and subsequent generation of the promotion;

wherein the dynamic instantiation of the selected promotion template and subsequent generation of the promotion comprises:

determining, via a promotion template system including a template computing device and a processor, a service category of the provider based at least in part on the accessed provider characteristic data related to the provider;

accessing the promotion templates for the service category, each promotion template comprising a sequence of variables that, when concatenated, will produce a particular promotion;

determining a plurality of promotion parameter terms and at least one descriptor connector term, the at least one descriptor connector term developed using a supervised learning model, wherein the determination of the at least one descriptor connector term comprises: continually analyzing, via the supervised learning model, historical promotion data and determining a promotion score as a function of, at least in part, a frequency the particular promotion is used within a particular provider service category in a service taxonomy;

determining a descriptor term based on the service category of the provider;

sequentially concatenating the plurality of promotion parameter terms, the at least one descriptor connector term, and the descriptor term;

determining, via the promotion template system including the template computing device and the processor, the promotion score for each of the promotion templates previously determined for the service category if populated with the sequentially concatenated plurality of promotion parameter terms, the at least one descriptor connector term, and the descriptor term, the determination of the promotion score comprising:

accessing a promotion performance score for each of the plurality of promotion parameter terms; and analyzing historical promotion data, via application of the supervised learning model to determine a promotion quality metric value as a function of each of the plurality of promotion parameter terms, the at least one descriptor connector term, and the descriptor term;

selecting the selected promotion template from the promotion templates based at least in part on determining a highest promotion score; and dynamically instantiating the selected promotion template with the sequentially concatenated plurality of promotion parameter terms, the at least one descriptor connector term, and the descriptor term, upon real-time access to the provider characteristic data, via the web-based interface, the web-based interface configured for display on a merchant device, the dynamic instantiation of the selected promotion template with the sequentially concatenated plurality of promotion parameter terms, the at least one descriptor connector term, and the descriptor term, causing generation of the promotion.

2. The method of claim 1, wherein the promotion templates each defines at least one connector term, the at least one descriptor connector term, and at least one of the plurality of promotion parameter terms.

3. The method of claim 2, wherein the at least one connector term comprises at least one basic connector term.

4. The method of claim 2, wherein the at least one descriptor connector term is based at least in part on the service category.

5. The method of claim 2, wherein the at least one descriptor connector term corresponds to at least one good, service, and/or experience provided by a provider in the promotion.

6. The method of claim 2, wherein each of the plurality of promotion parameter terms comprises at least one promotional value and at least one accepted value.

7. The method of claim 6 further comprising:
generating a promotional value of the at least one promotional value based on a historical promotion score for one or more promotions in the service category; and
displaying the promotional value as part of the promotion.

8. The method of claim 2, wherein the at least one descriptor term is defined based at least in part on the service category of the provider.

9. The method of claim 1, wherein each of the plurality of promotion parameter terms is normalized across the promotion templates.

10. The method of claim 1, wherein the provider characteristic data comprises at least one of registration information, provider name, or provider location.

11. A computer program product for programmatically updating a web-based interface based on applying a learning model to promotion templates, comprising:

at least one computer readable non-transitory memory medium having program code instructions stored thereon, the program code instructions which when executed by an apparatus cause the apparatus at least to:

provide access to the web-based interface, the web-based interface configured for receiving information corresponding to a promotion a provider wishes to offer;

receive a request for the promotion from the provider using the web-based interface configured for promotion generation, the request comprising at least an identification of the provider and an identification of at least one good or service that is be included in the promotion;

access, in real-time, provider characteristic data for a dynamic instantiation of a selected and displayed promotion template and subsequent generation of the promotion;

wherein the program code instructions which when executed cause the apparatus at least to perform the dynamic instantiation of the selected promotion template and subsequent generation of the promotion comprises program code instructions which when executed by an apparatus cause the apparatus at least to:

determine, via a promotion template system including a template computing device and a processor, a service category of the provider based at least in part on the accessed provider characteristic data related to the provider;

access the promotion templates for the service category, each promotion template comprising a sequence of variables that, when concatenated, will produce a particular promotion;

determine a plurality of promotion parameter terms and at least one descriptor connector term, the at least one descriptor connector term developed using a supervised learning model, wherein the determination of the at least one descriptor connector term comprises: continually analyzing, via the supervised learning model historical promotion data and determining a promotion score as a function of, at least in part, a frequency the particular promotion is used within a particular provider service category in a service taxonomy;

determine a descriptor term based on the service category of the provider;

sequentially concatenate the plurality of promotion parameter terms, the at least one descriptor connector term, and the descriptor term;

determine, via the promotion template system including the template computing device and the processor, the promotion score for each of the promotion templates previously determined for the service category if populated with the sequentially concatenated plurality of promotion parameter terms, the at least one descriptor connector term, and the descriptor term, the determination of the promotion score comprising:

accessing a promotion performance score for each of the plurality of promotion parameter terms; and analyzing historical promotion data, via application of the supervised learning model to determine a promotion quality metric value as a function of each of the plurality of promotion parameter terms, the at least one descriptor connector term, and the descriptor term;

select the selected promotion template from the promotion templates based at least in part on determining a highest promotion score; and dynamically instantiate the selected promotion template with the sequentially concatenated plurality of promotion parameter terms, the at least one descriptor connector term, and the descriptor term, upon real-time access to the provider characteristic data, via the web-based interface, the web-based interface configured for display on a merchant device, the dynamic instantiation of the selected promotion template with the sequentially concatenated plurality of promotion parameter terms, the at least one descriptor connector term, and the descriptor term.

12. The computer program product of claim 11, wherein the promotion templates each defines at least one connector term, the at least one descriptor connector term, and at least one of the plurality of promotion parameter terms.

13. The computer program product of claim 12, wherein the at least one descriptor term is based at least in part on the service category.

14. The computer program product of claim 12, wherein the at least one connector term comprises at least one basic connector term.

15. The computer program product of claim 12, wherein the at least one descriptor connector term corresponds to at least one good, service, and/or experience provided by a provider in a promotion.

16. The computer program product of claim 12, wherein each of the plurality of promotion parameter terms comprises at least one promotional value and at least one accepted value.

17. The computer program product of claim 16, further comprising program code instructions which when executed by an apparatus further cause the apparatus to:
generate a promotional value of the at least one promotional value based on a historical promotion score for one or more promotions in the service category; and
display the promotional value as part of the promotion.

18. The computer program product of claim 12, wherein the at least one descriptor connector term is defined based at least in part on the service category of the provider.

19. The computer program product of claim 11, wherein each of the plurality of promotion parameter terms is normalized across the promotion templates.

20. The computer program product of claim 11, wherein the provider characteristic data comprises at least one of registration information, provider name, or provider location.

21. An apparatus for programmatically updating a web-based interface based on applying a learning model to promotion templates, comprising:
at least one processor; and
at least one memory including computer program code, the at least one memory and the computer program code configured to, with the at least one processor, cause the apparatus to:
provide access to the web-based interface, the web-based interface configured for receiving information corresponding to a promotion a provider wishes to offer;
receive a request for the promotion from the provider using the web-based interface configured for promotion generation, the request comprising at least an identification of the provider and an identification of at least one good or service that is to be included in the promotion;
access, in real-time, provider characteristic data for a dynamic instantiation of a selected and displayed promotion template and subsequent generation of the promotion;
wherein the dynamic instantiation of the selected promotion template and subsequent generation of the promotion comprises computer program code configured to, with the at least one processor, cause the apparatus to:
determine, via a promotion template system including a template computing device and a processor, a service category of the provider based at least in part on accessed provider characteristic data related to the provider;
access promotion templates for the service category, each promotion template comprising a sequence of variables that, when concatenated, will produce a particular promotion;
determine a plurality of promotion parameter terms and at least one descriptor connector term, the at least one descriptor connector term developed using a supervised learning model,
wherein the determination of the at least one descriptor connector term comprises: continually analyzing, via the supervised learning model historical promotion data and determining a promotion score as a function of, at least in part, a frequency the particular promotion is used within a particular provider service category in a service taxonomy;
determine a descriptor term based on the service category of the provider;
sequentially concatenate the plurality of promotion parameter terms, the at least one descriptor connector term, and the descriptor term;
determine the promotion score for each of the promotion templates previously determined for the service category if populated with the sequentially concatenated plurality of promotion parameter terms, the at least one descriptor connector term, and the descriptor term, the determination of the promotion score comprising:
accessing a promotion performance score for each of the plurality of promotion parameter terms; and
analyzing historical promotion data, via application of the supervised learning model to determine a promotion quality metric value as a function of each of the plurality of promotion parameter terms, the at least one descriptor connector term, and the descriptor term;
select the selected promotion template from the promotion templates based at least in part on determining a highest promotion score; and
dynamically instantiate the selected promotion template with the sequentially concatenated plurality of promotion parameter terms, the at least one descriptor connector term, and the descriptor term, upon real-time access to the provider characteristic data, via the web-based interface, the web-based interface configured for display on a merchant device, the dynamic instantiation of the selected promotion template with the sequentially concatenated plurality of promotion parameter terms, the at least one descriptor connector term, and the descriptor term, causing generation of the promotion.

22. The apparatus of claim 21, wherein the promotion templates each defines at least one connector term, the at least one descriptor connector term, and the plurality of promotion parameter terms.

23. The apparatus of claim 22, wherein the at least one descriptor connector term is based at least in part on the service category.

24. The apparatus of claim 22, wherein the at least one connector term comprises at least one basic connector term.

25. The apparatus of claim 22, wherein the at least one descriptor connector term corresponds to at least one good, service, and/or experience provided by a provider in a promotion.

26. The apparatus of claim 22, wherein the at least one promotion parameter term comprises at least one promotional value and at least one accepted value.

27. The apparatus of claim 26, wherein the at least one memory and the computer program code are configured to, with the at least one processor, further cause the apparatus to:
generate a promotional value of the at least one promotional value based on a historical promotion score for one or more promotions in the service category; and
display the promotional value as part of the promotion.

28. The apparatus of claim 22, wherein the at least one descriptor term is defined based at least in part on the service category of the provider.

29. The apparatus of claim 21, wherein each of the plurality of promotion parameter terms is normalized across the promotion templates.

30. The apparatus of claim 21, wherein the provider characteristic data comprises at least one of registration information, provider name, or provider location.

* * * * *